US 10,476,264 B2

United States Patent
Vijayan et al.

(10) Patent No.: US 10,476,264 B2
(45) Date of Patent: Nov. 12, 2019

(54) SYSTEM AND METHOD FOR FAULT RIDE THROUGH

(71) Applicant: GENERAL ELECTRIC COMPANY, Schenectady, NY (US)

(72) Inventors: Pradeep Vijayan, Karnataka (IN); Satish Prabhakaran, Albany, NY (US); John Oliver Collins, Cheltenham (GB); Vishnu Mahadeva Iyer, Raleigh, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 201 days.

(21) Appl. No.: 15/343,333

(22) Filed: Nov. 4, 2016

(65) Prior Publication Data

US 2017/0141570 A1 May 18, 2017

(30) Foreign Application Priority Data

Nov. 18, 2015 (IN) .......................... 6216/CHE/2015

(51) Int. Cl.
*H02J 1/00* (2006.01)
*H02J 13/00* (2006.01)
(Continued)

(52) U.S. Cl.
CPC ............ *H02J 1/00* (2013.01); *H02J 13/0003* (2013.01); *H02M 1/32* (2013.01); *H02M 3/28* (2013.01);
(Continued)

(58) Field of Classification Search
CPC ............................ H02J 1/00; H02M 2001/325
See application file for complete search history.

(56) References Cited

U.S. PATENT DOCUMENTS

| 8,148,848 B2 | 4/2012 | Rusan et al. |
| 8,320,090 B2 | 11/2012 | Rozman et al. |

(Continued)

FOREIGN PATENT DOCUMENTS

| CN | 102820646 | 12/2012 |
| CN | 103378603 | 10/2013 |

(Continued)

OTHER PUBLICATIONS

Bailey,"Protection and switching of large loads for the more electric aircraft", Power Electronics and Applications, 2009. EPE '09. 13th European Conference on, pp. 1-15, Sep. 8-10, 2009.

(Continued)

*Primary Examiner* — Jeffrey M Shin
(74) *Attorney, Agent, or Firm* — McGarry Bair PC

(57) ABSTRACT

A power distribution system in operative association with a source and a plurality of loads includes a converter, a power distribution unit including a plurality of solid state power controllers and configured to provide power from converter to plurality of loads, and a fault protection unit operatively coupled to converter, power distribution unit, or both. The fault protection unit includes a sensor configured to sense current at output terminal of at least one of power distribution unit and converter and a controller configured to compare sensed current with a corresponding threshold value of current, identify presence of a fault in at least one of plurality of loads, power distribution unit, and converter based on comparison, and activate a desired protection scheme to provide fault ride through during the presence of the fault.

19 Claims, 3 Drawing Sheets

(51) Int. Cl.
H02M 3/335 (2006.01)
H02M 7/04 (2006.01)
H02M 1/32 (2007.01)
H02M 3/28 (2006.01)
H02J 1/08 (2006.01)

(52) U.S. Cl.
CPC ......... *H02M 3/33546* (2013.01); *H02M 7/04* (2013.01); *H02J 1/08* (2013.01); *H02M 2001/325* (2013.01)

(56) References Cited

U.S. PATENT DOCUMENTS

| | | | |
|---|---|---|---|
| 8,390,151 B2 | 3/2013 | Rozman et al. | |
| 8,390,972 B2 | 3/2013 | Simper et al. | |
| 8,395,873 B2 | 3/2013 | Rozman et al. | |
| 8,704,574 B2 | 4/2014 | Prabhuk et al. | |
| 8,890,463 B2 | 11/2014 | Rozman et al. | |
| 2005/0185352 A1* | 8/2005 | Nguyen | H02J 1/10 361/90 |
| 2012/0049805 A1 | 3/2012 | Ranosyan et al. | |
| 2013/0050890 A1* | 2/2013 | Rozman | H03K 17/082 361/90 |
| 2013/0207705 A1 | 8/2013 | Prabhuk et al. | |
| 2013/0229050 A1 | 9/2013 | Shipley et al. | |
| 2013/0329329 A1 | 12/2013 | Liu et al. | |
| 2014/0217821 A1* | 8/2014 | Rozman | H02J 1/14 307/29 |
| 2015/0015066 A1 | 1/2015 | Dong et al. | |

FOREIGN PATENT DOCUMENTS

| | | |
|---|---|---|
| GB | 2494133 A | 3/2013 |
| WO | 2014177817 A1 | 11/2014 |

OTHER PUBLICATIONS

Yuan, "High current and thermal transient design of a SiC SSPC for aircraft application", Applied Power Electronics Conference and Exposition (APEC), 2011 Twenty-Sixth Annual IEEE, pp. 1290-1297, Mar. 6-11, 2011.

Office Action issued in connection with corresponding CA Application No. 2947465 dated Sep. 25, 2017.

Machine Translation and First Office Action and Search issued in connection with corresponding CN Application No. 201611016088.1, dated Jul. 18, 2019.

* cited by examiner

SYSTEM AND METHOD FOR FAULT RIDE THROUGH

BACKGROUND

Embodiments of the present specification generally relate to a power distribution system and more specifically to a direct current (DC) power distribution system configured to ride through any associated faults.

Typically, power distribution systems used in aircrafts are alternating current (AC) power distribution systems. However, in recent times, use of a direct current (DC) power distribution system in aircrafts is being deliberated. The use of the DC power distribution systems aids in circumventing use of a transformer, thereby reducing the footprint of the power distribution system.

The DC power distribution systems used in aircrafts, ships, industrial applications, and military applications typically include a converter for feeding multiple 28 volts (V) loads. This converter is configured to down convert an input voltage from +/−270 V DC to 28 V DC. Furthermore, the converter provides power to each of the 28 V loads via a power distribution unit, where the power distribution unit includes an aggregation of switches.

During operation, these 28 V loads may encounter different types of faults. A faulty load results in a demand for a higher value of current from the converter via the power distribution unit. Also, when the 28 V loads are coupled to the DC power distribution system, during an initial period, there is a sudden high demand of current from the converter. The sudden high demand of current in turn causes damage to the DC power distribution system.

Generally, in the DC power distribution systems, the converter provides a substantially similar or a slightly higher output current to the power distribution unit than an overall rating of power distribution unit. Consequently, any over-current drawn from the power distribution unit is also drawn from the converter. In one example, the DC power distribution system for use in aircrafts is designed to withstand up to ten times the over-current for as long as 100 milliseconds. As a result, the converter needs to be designed to provide a higher value of current for at least 100 milliseconds. Any modification of the converter design results in an increase in the size, weight, and/or cost of converter. Also, the overall rating of the converter may increase considerably.

BRIEF DESCRIPTION

In accordance with aspects of the present specification, a power distribution system for providing fault ride through is presented. The system is in operative association with a source and a plurality of loads. The system includes a converter, a power distribution unit including a plurality of solid state power controllers and configured to provide power from the converter to the plurality of loads, and a fault protection unit operatively coupled to the converter, the power distribution unit, or both. The fault protection unit includes a sensor configured to sense a current at an output terminal of at least one of the power distribution unit and the converter. Further, the fault protection unit includes a controller configured to compare the sensed current with a corresponding threshold value of current, identify presence of a fault in at least one of the plurality of loads, the power distribution unit, and the converter based on the comparison, and activate a desired protection scheme to provide the fault ride through during the presence of the fault.

In accordance with another aspect of the present specification, a method for providing fault ride through in a power distribution system, where the system is in operative association with a source and a plurality of loads is presented. The method includes sensing, using a sensor, a current at an output terminal of at least one of a power distribution unit and a converter of the power distribution system. Further, the method includes comparing, using a controller of a fault protection unit in the power distribution system, the current sensed at the output terminal of the at least one of the power distribution unit and the converter with a corresponding threshold value of current via a controller of the fault protection unit. Moreover, the method includes identifying, using the controller, presence of a fault in at least one of the plurality of loads, the power distribution unit, and the converter based on the comparison. The method further includes activating, using the controller, a desired protection scheme to provide fault ride through during the presence of the fault.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
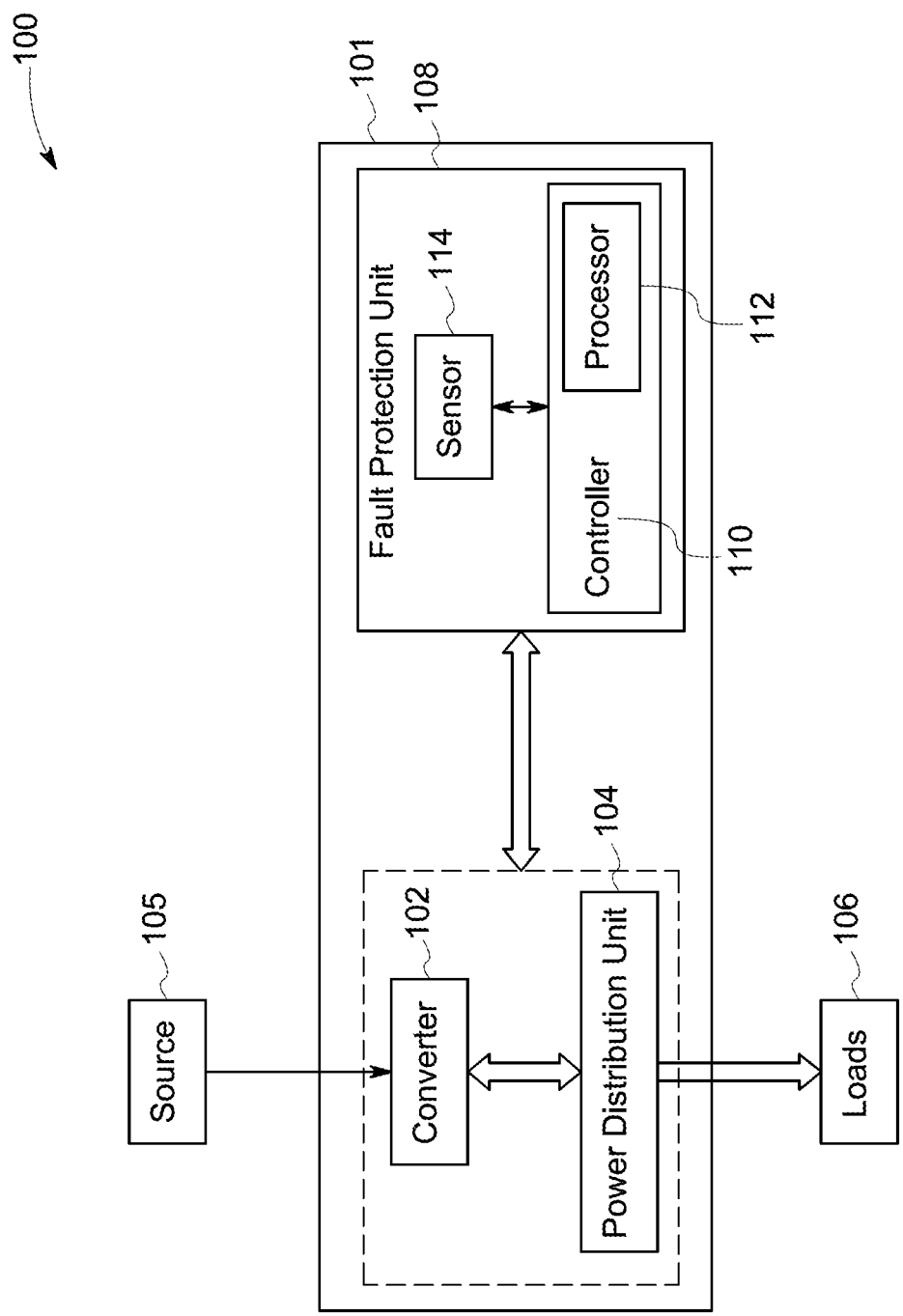
FIG. 1 is a diagrammatical representation of a power distribution system configured to provide fault ride through, according to aspects of the present specification.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

The term "operatively coupled," as used herein, includes wired coupling, wireless coupling, electrical coupling, magnetic coupling, radio communication, software based communication, or combinations thereof.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be described in detail hereinafter, various embodiments of a power distribution system and a method of operating the power distribution system are presented. In particular, the power distribution system is capable of riding through a fault. Also, the power distribution system, as described herein, is a direct current (DC) power distribution system. According to aspects of the present specification, the power distribution system is configured to provide power to multiple loads in aircrafts, ships, trains, vehicles, submarines, various commercial/industrial applications, and the like. The loads in the aircraft, for example, include 28 V loads, such as, but not limited to, landing lights, strobe lights, aircraft radios, transponders, intercom, and other aircraft based electronic systems.

Turning now to the drawings, by way of example in FIG. 1, a diagrammatical representation 100 of a system for distributing power from a source 105 to a plurality of loads 106 is depicted. In particular, the system 100 includes a power distribution system 101 configured to provide fault ride through, according to aspects of the present specification. The term 'fault ride through,' as used herein, may be used to refer to a capability of an electrical system to continue to operate through periods of fault. In one example, the fault ride through may be a low voltage ride through.

The power distribution system 101 includes a converter 102 and a power distribution unit 104. The power distribution system 101 is operatively coupled to the source 105 and the plurality of loads 106. In particular, the converter 102 is operatively coupled to the source 105. Further, the converter 102 is operatively coupled to the plurality of loads 106 via the power distribution unit 104. In one embodiment, the converter 102 may include a direct current (DC) to DC converter, an alternating current (AC) to DC converter, and the like. The converter 102 may include a multilevel converter or a modular multilevel converter (MMC).

Power provided by the source 105 is converted by the converter 102 and provided to the power distribution unit 104. Further, the power distribution unit 104 provides the power to the plurality of loads 106. The term 'power,' as used herein, refers to a product of voltage and current. In one example, the power distribution unit 104 includes a plurality of solid state power controllers (SSPCs). The SSPCs aid in coupling the converter 102 to the plurality of loads 106. In particular, one SSPC aids in coupling the converter 102 to one load of the plurality of loads 106.

Further, the power distribution system 101 includes a fault protection unit 108. The fault protection unit 108 is operatively coupled to the converter 102, the power distribution unit 104, or both. In one embodiment, the fault protection unit 108 may be integrated with the converter 102. The fault protection unit 108 includes a sensor 114 for sensing electrical parameters, such as current and voltage. In one embodiment, the sensor 114 may be a current sensor or a voltage sensor. In a presently contemplated configuration, the sensor 114 is located in the fault protection unit 108. However, in other embodiments, the sensor 114 may be located external to the fault protection unit 108. In the example where the sensor 114 is located external to the fault protection unit 108, the sensor 114 communicates with the fault protection unit 108 by wired or wireless means. Additionally, in the wireless alternative, the sensor 114 and the fault protection unit 108 may have transmitter, receiver or transceiver capability.

In addition, the fault protection unit 108 includes a controller 110. The controller 110 includes at least one processor 112. In the example of FIG. 1 the controller 110 is shown as including the processor 112. However, in other embodiments, the processor 112 may be separate from the controller 110. The controller 110 may be a digital controller or an analog controller. The fault protection unit 108 is configured to identify presence of a fault in one or more of the converter 102, the power distribution unit 104, and the loads 106. In addition, the fault protection unit 108 is configured to provide fault ride through for the power distribution system 101, if the presence of a fault in one or more of the converter 102, the power distribution unit 104, and the loads 106 is identified.

In one embodiment, the fault protection unit 108 may be configured to provide the fault ride through by activating a desired protection scheme for circumventing the identified fault. The desired protection scheme may be stored/programmed in the controller 110, in one example. The fault may include any over-current fault in one or more of the converter 102, the power distribution unit 104, and the loads 106, in one non-limiting example. The operation of the fault protection unit 108 will be described in greater detail with reference to FIG. 3.

Figure 2:
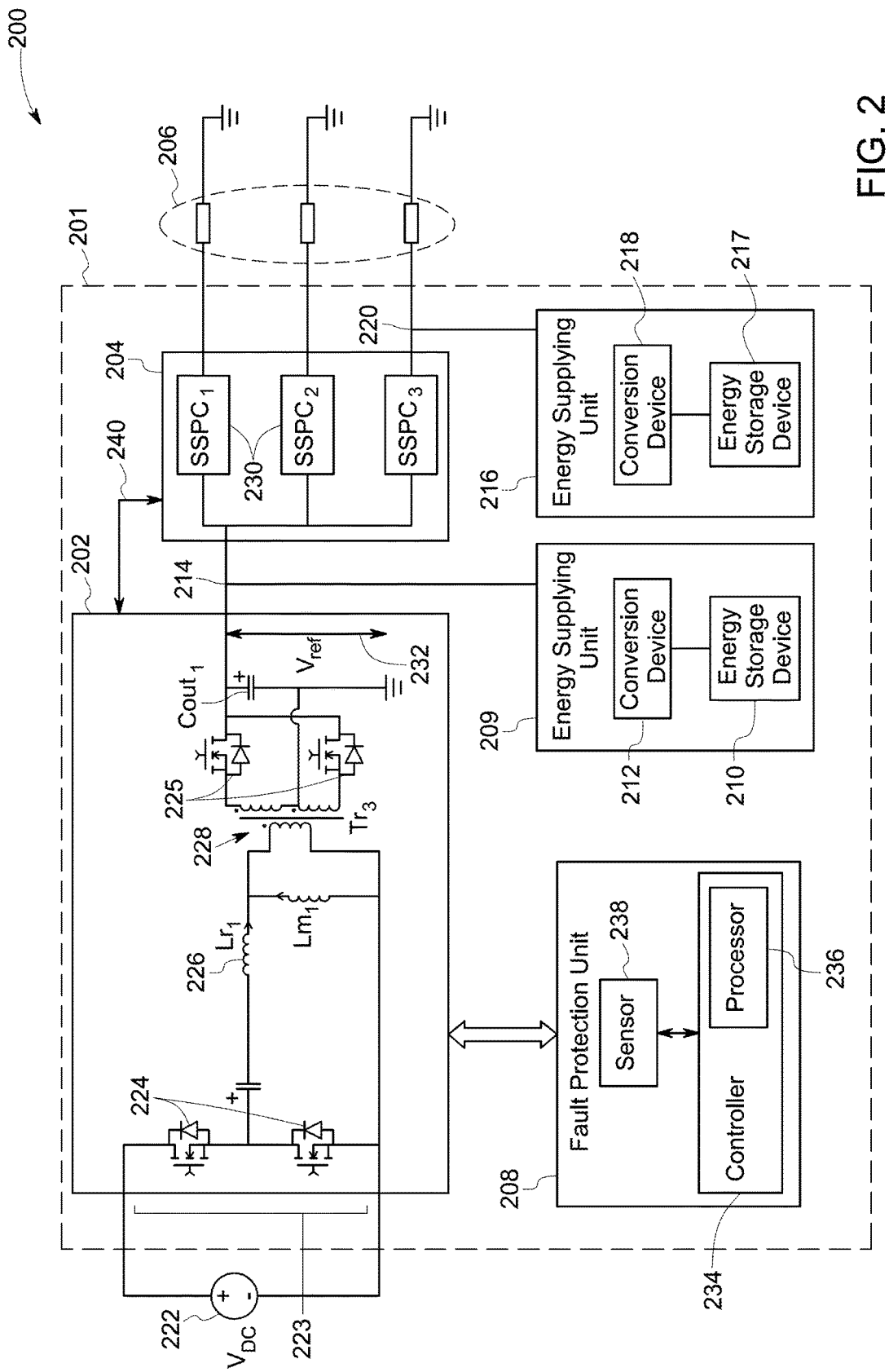
FIG. 2 is a diagrammatical representation of another embodiment of the power distribution system of FIG. 1, according to aspects of the present specification.

Referring now to FIG. 2, a diagrammatical representation 200 of one embodiment of the system 100 of FIG. 1. The system 200 includes a power distribution system 201 that is operatively coupled to a source 222 and a plurality of loads 206. In particular, the source 222 is coupled to a terminal 223 of the power distribution system 201. The power distribution system 201 is configured to provide fault ride through in the eventuality of a fault in one or more components of the system 200.

In one embodiment, the power distribution system 201 includes a converter 202 and a power distribution unit 204. The converter 202 is configured to convert the power provided from the source 222 to a desired value. Further, the power from the converter 202 is provided to the power distribution unit 204. The power distribution unit 204 is configured to distribute power to the plurality of loads 206.

In a presently contemplated configuration, the converter 202 includes a plurality of semiconductor switches 224, 225, and magnetic components 226, 228. The magnetic component 226 is an inductor represented as $L_{r1}$. Also, the magnetic component 228 is a transformer represented as $T_{r3}$. It may be noted that the inductance $L_{m1}$ is representative of the magnetizing inductance of the transformer $T_{r3}$. The semiconductor switches 224, 225 may include silicon based switches, silicon carbide based switches, gallium arsenide based switches, gallium nitride based switches, or combinations thereof. An output of the converter 202 is obtained across the capacitor $C_{out1}$. The output voltage 232 of the converter 202 may be referred to as a reference voltage ($V_{ref}$).

In addition, the power distribution unit 204 includes a plurality of solid state power controllers (SSPCs) 230. In the example of FIG. 2, the power distribution unit 204 is shown to have three SSPCs represented as $SSPC_1$, $SSPC_2$, and $SSPC_3$. The term "solid state power controller," as used herein, may be used to refer to semiconductor devices that control voltage and/or current supplied to a load. In the example of FIG. 2, the SSPCs 230 may include one or more metal oxide field effect transistors (MOSFETs) or insulated-gate bipolar transistors (IGBTs). However, in other embodiments, the SSPCs 230 may be any silicon based switches, silicon carbide based switches, gallium arsenide based switches, gallium nitride based switches, or combinations thereof. In another embodiment, the power distribution unit 204 may include a plurality of electromechanical power controllers. The electromechanical power controllers may be a mechanical contactor, an electromechanical switch, or a combination thereof. In yet another embodiment, the power distribution unit 204 may include a combination of the electromechanical power controllers and the SSPCs. Also, the power distribution unit 204 has an input terminal 214 and an output terminal 220. Reference numeral 214 may be alternatively used to represent the output terminal of the converter 202. Furthermore, in one embodiment, each of the SSPCs 230 may have inbuilt current and voltage sensors for measuring the current and voltage, respectively.

Furthermore, the power distribution system 201 includes a fault protection unit 208. The fault protection unit 208 includes a controller 234. In one example, the controller 234 includes at least one processor 236. The fault protection unit 208 may also include at least one sensor 238 for sensing the electrical parameters, such as current. The fault protection unit 208 may be configured to identify a fault in one or more of the plurality of loads 206, the power distribution unit 204, and the converter 202 based on a comparison of a current sensed at an output terminal of the power distribution unit 204 and/or the converter 202 with a corresponding threshold value of current. In one example, the current sensed at the output terminal of the power distribution unit 204 and/or the converter 202 having a value that is higher than a corresponding threshold value of current may be indicative of a presence of a fault in the converter 202, the power distribution unit 204, and/or the plurality of loads 206. It may be noted that although the embodiment of FIG. 2 depicts the fault protection unit 208 as including the sensor 238, in some embodiments, the sensor 238 may be external to the fault protection unit 208. Also, although the embodiment of FIG. 2 depicts the processor 236 as an integral part of the controller 234, in some embodiments, the processor 236 may be external to the controller 234. Further, although the embodiment of FIG. 2 represents the controller 234 as an integral part of the fault protection unit 208, in some embodiments, the controller 234 may be external to the fault protection unit 208.

As noted hereinabove, the power distribution system 201 is configured to provide fault ride through during occurrence of any faults in the components of the system 200. In particular, the fault protection unit 208 is configured to activate a desired protection scheme for circumventing the identified fault, hence providing fault ride through. In one embodiment, the desired protection schemes may be stored/programmed in a lookup table. The activation of the desired protection scheme will be described in greater detail with reference to FIG. 3.

Occurrence of a fault in one or more of the plurality of loads 206 may result in a demand for excess power from the converter 202. However, the converter 202 alone may not be capable of satisfying this demand for excess power. If the converter is to provide for the demand for excess power by the loads 206, the components of the converter 202 need to be significantly overrated. The overrating of components of the converter 202 may cause the cost and/or size of the converter to increase considerably. Therefore, it is desirable not to significantly overrate the components of the converter 202.

The problems associated with overrating may be circumvented via use of an exemplary energy supplying unit. In particular, in order to withstand the excess demand of power by the loads 206, the power distribution system 201 may include one or more energy supplying units 209, 216, in one example. The energy supplying unit 209 may be selectively coupled to the input terminal 214 of the power distribution unit 204. Furthermore, the energy supplying unit 216 may be selectively coupled to an output terminal of the power distribution unit 204. In particular, the energy supplying unit 216 may be selectively coupled to the output terminal 220 of the SSPC 230 of the power distribution unit 204. Although in the example of FIG. 2, one energy supplying unit is shown as being coupled to the output terminal of one SSPC, similar energy supplying units may be coupled to output terminals of other SSPCs 230 of the power distribution unit 204. The energy supplying units 209, 216, in conjunction with the converter 202 may be configured to provide the desired power to the plurality of loads 206.

In certain embodiments, upon occurrence of a fault in one or more of the plurality of loads 206, one of the energy supplying units 209 may be selectively coupled to the input terminal 214 of the power distribution unit 204. On occurrence of the fault in the loads 206, the energy supplying unit 209 may provide the excess power to the loads 206 in addition to the power provided by the converter 202. In another example, in the event of occurrence of a fault in the plurality of loads 206, the converter 202 may be deactivated for a predefined time to prevent damage to components of the converter 202. During the predefined period of time, the power to the loads 206 may be provided from one or more energy supplying units 209, 216, in one embodiment. The predefined period of time may be representative of an inherent hold up time (for example, 100 ms) of the plurality of loads 206, in one non-limiting example. Thus, the energy supplying units 209, 216 also aid in circumventing a fault in the loads 206.

With continuing reference to FIG. 2, in one embodiment, the energy supplying unit 209 includes an energy storage device 210 operatively coupled to a conversion device 212. The energy storage device 210 may be configured to store and supply voltage, while the conversion device 212 may be configured to appropriately convert the voltage supplied by the energy storage device 210 to a desired value of voltage for the loads 206. In other embodiments, the energy storage device 210 may be connected to the output terminal 214 of the converter 202 via a series switch instead of the conversion device 212.

The energy storage device 210 includes a battery, in one example. In another example, the energy storage device 210 includes a capacitor bank configured to store energy. In yet another example, the energy storage device 210 may be an ultra-capacitor. In the example of FIG. 2, the energy storage device 210 may include a 540 V capacitor bank. Use of the 540 V capacitor bank aids in reducing the footprint of the power distribution system 201. In another example, the energy storage device 210 may include a 28 V capacitor bank or a capacitor bank having a rating lesser than 28 V.

As previously noted, the loads 206 have a 28 V rating and hence, call for an input of 28 V. Accordingly, if the energy storage device 210 is a 540 V capacitor bank, the conversion device 212 is used to step down the voltage from 540 V to 28 V. The conversion device 212 is a step down converter, in one embodiment.

Similarly, the energy supplying unit 216 includes an energy storage device 217 operatively coupled to a conversion device 218. In one example, the energy storage device 217 is a 540 V capacitor bank and the conversion device 218 is a step down converter. The conversion device 218 is configured to step down the voltage (for example, 540 V) provided by the energy storage device 217 to a voltage to be supplied to the loads (for example, 28 V).

In another embodiment, the energy storage devices 210, 217 may include an ultra-capacitor having a rating lesser than 28 V. In such a scenario, the conversion devices 212, 218 are step-up converters. In yet another embodiment, the energy storage devices 210, 217 may include an ultra-capacitor having a rating of 28 V. In such a scenario, the conversion devices 212, 218 may be converters having a conversion ratio of 1:1. The term, conversion ratio, as used herein, refers to a ratio between an output and input voltage of the converter.

Moreover, in certain embodiments, the energy supplying units 209, 216, the power distribution unit 204, the converter 202, and the fault protection unit 208 may be packaged as a single unit. In another example, the fault protection unit 208 may be integrated with the power distribution unit 204 or the converter 202.

Figure 3:
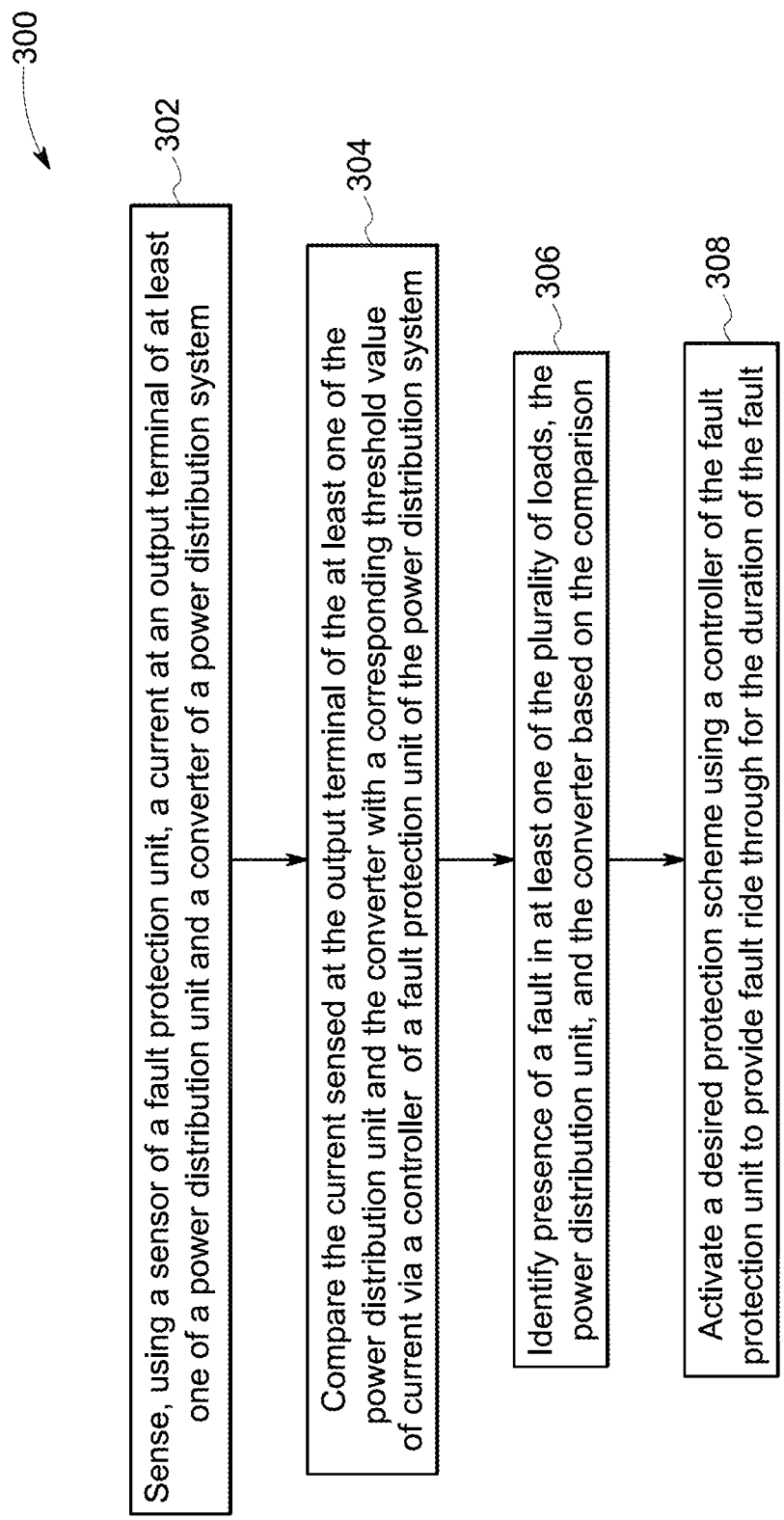
FIG. 3 is a flow chart representing an exemplary method for fault ride through in a power distribution system, according to aspects of the present specification.

FIG. 3 is a flow chart 300 representing an exemplary method for providing fault ride through in a power distribution system, according to aspects of the present specification. FIG. 3 will be described with reference to the elements of FIG. 2.

The method begins at block 302, where a current at an output terminal of at least one of the power distribution unit 204 and the converter 202 is sensed using the fault protection unit 208. In particular, the sensor 238 in the fault protection unit 208 may be used to sense the current at the output terminal of the power distribution unit 204 and/or the converter 202.

Furthermore, at block 304, the current sensed at the output terminal 220 of at least one of the power distribution unit 204 and the converter 202 is compared with a corresponding threshold value of current via the fault protection unit 208. The threshold values of current may be determined based on prior experimentations and/or simulations. Also, in some embodiments, the threshold values may be stored in one or more lookup tables.

Subsequently, as indicated by block 306, presence of a fault in one or more of the plurality of loads 206, the power distribution unit 204, and the converter 202 may be determined using the fault protection unit 208. In particular, the fault protection unit 208 may be configured to determine the presence of a fault based on the comparison at block 304.

In certain embodiments, the fault protection unit 208 may be configured to identify the presence of a fault in one or more of the loads 206, the power distribution unit 204, and the converter 202 if the magnitude of the current measured at an output terminal of at least one of the power distribution unit 204 and the converter 202 is higher than the corresponding threshold value of current. By way of example, the current at the output terminal 220 of the power distribution unit 204 may be compared with a threshold value of current corresponding to the power distribution unit 204. In a similar fashion, the current at the output terminal 214 of the converter 202 may be compared with a threshold value of the current corresponding to the converter 202. It may be noted that the threshold value of current corresponding to the power distribution unit 204 may be different from the threshold value of the current corresponding to the converter 202.

Once the presence of a fault is detected by the fault protection unit 208, the fault protection unit 208 may be configured to provide fault ride through for the duration of the fault. Accordingly, in one embodiment, the fault protection unit 208 may activate a desired protection scheme, as indicated by block 308. The desired protection scheme may be employed to provide fault ride through during the presence of the fault. In accordance with aspects of the present specification, different protection schemes may be activated based on the identified fault.

By way of example, if the identified fault corresponds to a fault in one of the plurality of loads 206, the desired protection scheme includes reducing a reference voltage $V_{ref}$ 232 of the converter 202. Accordingly, the controller 234 in the fault protection unit 208 increases a frequency of operation of the converter 202. This increase in the frequency of operation of the converter 202 results in an increase in the impedance of the magnetic component $L_{r1}$ 226. Consequently, the reference voltage $V_{ref}$ 232 across the capacitor $C_{out1}$ drops to a lower value. In one embodiment, the reference voltage $V_{ref}$ 232 may be reduced to about 28 V, which is the voltage rating of the loads 206. The lower value of the reference voltage $V_{ref}$ 232 in turn leads to reducing the current at the output terminal 214 of the converter 202 and at the output terminal 220 of the power distribution unit 204.

As noted hereinabove, the magnitude of the current measured at an output terminal of at least one of the power distribution unit 204 and the converter 202 being higher than that of the corresponding threshold value of current is indicative of the presence of a fault in the power distribution system 201. Lowering the value of the reference voltage $V_{ref}$ 232 results in reduction in the values of the current at the output terminal 214 of the converter 202 and at the output terminal 220 of the power distribution unit 204. This reduction in the values of the current at the output terminals 214, 220 of the converter 202 and the power distribution unit 204 may provide values of current that are lower than the corresponding threshold values of current. Consequently, fault ride through may be provided during the presence of the fault.

In another embodiment, when the presence of a fault in the plurality of loads 206 is identified, the desired protection scheme entails supplying any demand for excess power by the loads 206 from the energy supplying unit 209 that is coupled to the output terminal 214 of the converter 202. Accordingly, the energy supplying unit 209 may provide the excess power to the loads 206 in addition to the power provided by the converter 202. In the embodiment of FIG. 2, the energy supplying unit 209 is coupled to the output terminal 214 of the converter 202 and includes energy storage device 210 and the conversion device 212. In one embodiment, the energy storage device 210 is a 540 V capacitor bank and the conversion device 212 is a step down converter. The conversion device 212 may be configured to step down the 540 V provided by the energy storage device 210 to a desired value before being supplied to the plurality of loads 206. In one example, the desired value of voltage may be 28 V since the loads 206 have a rating of 28 volts.

Another embodiment of a protection scheme calls for shutting down the converter 202 for a predefined period of time in order to avoid the excess demand for power from the plurality of loads 206. During the predefined period of time, the power to the loads 206 may be provided from the energy supplying units 209, 216. The predefined period of time may be representative of an inherent hold up time (for example, 100 ms) of the plurality of loads 206, in one non-limiting example. Once the predefined period of time has elapsed, the converter 202 may be reactivated.

Further, in another embodiment, when there is a fault in one load of the plurality of loads 206, then the SSPC coupled to the faulty load is deactivated. As noted hereinabove, one SSPC is coupled to one load of the plurality of loads 206. The controller 234 may be configured to provide sufficient time for the SSPC coupled to the faulty load to be deactivated. The selective deactivation of the SSPC coupled to the faulty load in turn aids in avoiding deactivation of the converter 202 due to a fault in one load of the plurality of loads 206.

In certain scenarios, a fault in one load of the plurality of loads 206 results in a high demand for power from the SSPC coupled to the faulty load. In this example, the excess demand for power may be provided via the energy supplying unit coupled to the output terminal of the corresponding SSPC instead of providing the excess demand of power from the converter 202. In one example, if the load coupled to the $SSPC_3$ is faulty, the excess demand for power may be provided via the energy supplying unit 216 coupled to the output terminal 220 of the $SSPC_3$.

Activation of high amperage loads, such as a 15 Amperes load or a 25 Amperes load may result in a demand for a higher value of current from the converter 202. In such a scenario, the desired protection scheme may include applying a soft switching technique to the power distribution unit 204. The soft switching technique may entail operating the power distribution unit 204 using a pulse width modulation technique. As noted hereinabove, the power distribution unit 204 includes SSPCs 230, which in turn includes semiconductor switches. In the example where the power distribution unit 204 is operated via use of the pulse width modulation technique a switching pattern corresponding to the SSPCs 230 may be determined based on the pulse width modulation technique. Further, the SSPCs 230 may be selectively switched based on the determined switching pattern such that the voltage applied to the plurality of loads 206 gradually increases from an initial value of voltage. The initial value of voltage may be zero volts, in one example.

The selective switching of the switches in the SSPCs 230 may entail activation and deactivation of the switches in the SSPCs 230 based on the determined switching pattern. Consequent to the selective activation and/or deactivation of the switches in the SSPCs 230, the voltage applied to the plurality of loads 206 increases in a gradual manner, thereby avoiding a sudden surge in the supply of current from the converter 202 to the plurality of loads 206. In another embodiment, the desired protection scheme may include soft switching the converter 202 by switching the switches 224, 225 in the converter 202 based on a determined pulse width modulation technique.

In yet another embodiment, the protection scheme includes employing a real-time predefined thermal model for determining a temperature corresponding to the switches 224, 225 in the converter 202 and the switches corresponding to the SSPCs 230. In one example, the thermal model may include a resistor-capacitor (RC) thermal model. The RC thermal model includes a parallel-series combination of resistors and capacitors having determined values of resistance and capacitance. The temperature within a junction of the switches 224, 225 and the switches in the SSPCs 230 may be determined based on estimated losses, where the estimated losses are determined based on the current and voltage corresponding to the switches.

The determined temperature of the switches in the SSPCs 230 and the switches 224, 225 are compared to a threshold value of temperature. A pattern for selectively switching the switches in the SSPCs 230 and the switches 224, 225 may be determined based on the comparison. The switching pattern so determined is representative of an activation and/or deactivation of the switches. If the determined temperature is lower than the threshold value of the temperature, the switches corresponding to the SSPCs 230 and the switches 224, 225 may continue to be in the present state without causing any damage to the switches 224, 225, and the switches corresponding to the SSPCs 230. In one example, the damage to the switches may include a junction burnout of the switches.

However, if the determined temperature is higher than the threshold value of the temperature, the high temperature of the switches may be indicative of a fault in the switches. Accordingly, the desired protection scheme may entail deactivating faulty switches corresponding to the SSPCs 230 and the switches 224, 225 that are associated with the higher temperature to avoid any damage to the switches. The deactivation of the switches provides fault ride through for the duration of the fault. In one example, silicon carbide based switches may be employed in the power distribution unit 204 and the converter 202. The silicon carbide based switches have a higher operating junction temperature, thereby allowing the switches to withstand short spurts of thermal overloading.

As noted hereinabove, the presence of a fault in one or more of the plurality of loads 206, the power distribution unit 204, and the converter 202 may be identified if the magnitude of the current measured at the output terminal of at least one of the power distribution unit 204 and the converter 202 is higher than the corresponding threshold value of current. However, it may be desirable to isolate a location of the fault. In particular, it may be desirable to ascertain if the fault has occurred in one or more of the plurality of loads 206 or in the converter 202. To that end, the power distribution system 201 may include a communication channel that is operatively coupled between the converter 202, the power distribution unit 204, the fault protection unit 208, or combinations thereof, in certain embodiments.

In the example of FIG. 2, a communication channel 240 communicatively couples the converter 202 and the power distribution unit 204. Although the example of FIG. 2 depicts a communication channel 240 coupling the converter 202 and the power distribution unit 204, in some other embodiments, there may be communication channel for coupling the converter 202, the power distribution unit 204, the fault protection unit 208, or combinations thereof. The communication channel 240 may include a serial bus, an Ethernet cable, and the like. Also, the communication channel 240 aids in communicating which of the loads 206 is faulty and if the faulty load is a critical load to the converter 202, the power distribution unit 204, the fault protection unit 208, or combinations thereof. In the example where the power distribution system 201 in used in aircraft applications, the term 'critical load' may be used to refer to a load which is vital for an aircraft's operation. In this example, if the faulty load is not a critical load, then the converter 202 may be configured to direct the power distribution unit 204 to cut off power supply to that particular load.

In another example, the communication channel 240 aids in communicating demand of current at an output terminal of the converter 202 and at an output terminal of power distribution unit 204. If there is a high demand for current at the output terminal 214 of the converter 202 and a nominal demand for current demand at the output terminal 220 of the power distribution unit 204 this may be indicative of a fault in the converter 202. In this scenario, the desired protection scheme may entail deactivating the converter 202 for the duration of the fault using the fault protection unit 208 to prevent further damage to the converter 202.

Additionally, in another embodiment, the desired protection scheme includes avoiding saturation of any magnetic components of the converter 202 by using the fault protection unit 208. The term "saturation," may be used to refer to a condition when a flux density corresponding to a core of a magnetic component exceeds a saturation flux density corresponding to the core of that magnetic component. In a saturated state, the magnetic components $L_{r1}$ and $T_{r3}$ may operate as a short circuit. In such a scenario, the converter 202 may not be able to limit the current provided to the converter 202 from the source 222. In this example, the saturation of the magnetic components $L_{r1}$ 226 and $T_{r3}$ 228 may be prevented by limiting the current flowing through the magnetic components $L_{r1}$ 226 and $T_{r3}$ 228.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

Various embodiments of systems and methods described hereinabove present a power distribution unit/system that allows fault ride through. Furthermore, implementing the power distribution system as described hereinabove allows use of a nominal sized converter. Moreover, the rating and the cost of the converter is also considerably lower. Also, the use of the DC power distribution systems facilitates a substantial reduction in the footprint of the power distribution system. Additionally, the power distribution systems may find application in aviation, sub-marines, other marine applications, and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What we claim is:

1. A power distribution system for providing fault ride through whereby the power distribution system continues to operate through periods of faults, wherein the system is in operative association with a source and a plurality of loads, the system comprising:
   a converter configured to receive a first power and convert the first power to a second power, the converter having a current demand threshold defining a maximum second power providable;
   a power distribution unit comprising a plurality of solid state power controllers and configured to provide the second power from the converter to the plurality of loads;
   one or more energy supplying units selectively coupled to at least one of an input terminal and the output terminal of the power distribution unit and configured to supply a third power;
   a fault protection unit operatively coupled to the converter, the power distribution unit, or both, wherein the fault protection unit comprises:
   a sensor configured to sense a current at an output terminal of at least one of the power distribution unit and the converter;
   a controller configured to:
   compare the sensed current with a corresponding threshold value of current;
   identify presence of a fault in at least one of the plurality of loads, the power distribution unit, and the converter based on the comparison; and
   activate a desired protection scheme to provide the fault ride through during the presence of the fault, wherein the fault ride through includes supplying the third power to the at least one of the input terminal or the output terminal of the power distribution unit such that the provided second power does not exceed the current demand threshold of the converter.

2. The system of claim 1, wherein the one or more energy supplying units, the power distribution unit, the converter, and the fault protection unit are packaged as a single unit.

3. The system of claim 1, wherein the converter comprises a plurality of semiconductor switches.

4. The system of claim 1, wherein the converter and the power distribution unit comprise silicon carbide based switches.

5. The system of claim 1, wherein the converter comprises an alternating current to direct current converter or a direct current to direct current converter.

6. The system of claim 1, wherein the converter comprises a multilevel converter.

7. The system of claim 1, further comprising a communication channel configured to communicatively couple the converter, the power distribution unit, and the fault protection unit.

8. The system of claim 1, wherein the power distribution unit further comprises a plurality of electromechanical power controllers.

9. The system of claim 1, wherein the presence of the fault produces an excess power demand and the supplying of the third power to the at least one of an input terminal and the output terminal of the power distribution unit satisfies the excess power demand.

10. The system of claim 1, wherein the one or more energy supplying units each includes an energy storage device configured to store and supply voltage.

11. A method for providing fault ride through in a power distribution system whereby the power distribution system continues to operate through periods of faults, wherein the system is in operative association with a source and a plurality of loads, the method comprising:
    sensing, using a sensor, a current at an output terminal of at least one of a power distribution unit and a converter of the power distribution system, the converter converting a first power to a second power and having a current demand threshold defining a maximum current providable by the converter;
    comparing, using a controller of a fault protection unit in the power distribution system, the current sensed at the output terminal of at least one of the power distribution unit and the converter with the corresponding current demand threshold via a controller;
    identifying, using the controller, presence of a fault in at least one of the plurality of loads, the power distribution unit, and the converter based on the comparison; and
    activating, using the controller, a desired protection scheme to provide fault ride through during the presence of the fault, wherein the fault ride through includes supplying a third power from an energy storage device to at least one of an input terminal or the output terminal of the power distribution unit such that providing of the second power and the third power meets a fault ride through power demand wherein the provided second power does not exceed the current demand threshold of the converter.

12. The method of claim 11, wherein activating the desired protection scheme comprises reducing a reference voltage corresponding to the converter.

13. The method of claim 11, wherein activating the desired protection scheme comprises selectively coupling one or more energy supplying units to at least one of an input terminal and an output terminal of the power distribution unit.

14. The method of claim 11, wherein activating the desired protection scheme comprises soft switching at least one of a plurality of solid state power controllers in the power distribution unit and a plurality of switches in the converter.

15. The method of claim 14, wherein the soft switching of the plurality of solid state power controllers comprises operating at least one of the plurality of solid state power controllers and the plurality of switches in the converter using a pulse width modulation technique.

16. The method of claim 11, wherein activating the desired protection scheme comprises determining a temperature corresponding to at least one of a plurality of solid state power controllers in the power distribution unit and a plurality of switches in the converter.

17. The method of claim 16, wherein determining the temperature corresponding to at least one of the plurality of solid state power controllers and the plurality of switches in the converter comprises using a predefined thermal model corresponding to at least one of the plurality of solid state power controllers and the plurality of switches in the converter to provide fault ride through for the plurality of solid state power controllers and the plurality of switches corresponding to the converter.

18. The method of claim 16, further comprising:
    comparing the determined temperature corresponding to the at least one of the plurality of solid state power controllers and the plurality of switches in the converter to a threshold value of temperature; and
    determining a switching pattern of at least one of the plurality of solid state power controllers and the plurality of switches in the converter based on the comparison.

19. The method of claim 11, wherein activating the desired protection scheme comprises preventing saturation of a magnetic component corresponding to at least one of the converter and the power distribution unit.

* * * * *